US008593548B2

(12) United States Patent
Sun

(10) Patent No.: US 8,593,548 B2
(45) Date of Patent: Nov. 26, 2013

(54) APPARATAUS AND METHOD OF AUTOMATIC COLOR SHADING REMOVAL IN CMOS IMAGE SENSORS

(75) Inventor: Yajie Sun, Mountain View, CA (US)

(73) Assignee: Aptina Imaging Corporation, George Town (KY)

( * ) Notice: Subject to any disclaimer, the term of this patent is extended or adjusted under 35 U.S.C. 154(b) by 347 days.

(21) Appl. No.: 13/092,195

(22) Filed: Apr. 22, 2011

(65) Prior Publication Data
US 2012/0249828 A1 Oct. 4, 2012

Related U.S. Application Data

(60) Provisional application No. 61/468,225, filed on Mar. 28, 2011.

(51) Int. Cl.
H04N 9/64 (2006.01)
(52) U.S. Cl.
USPC .......................................... 348/251

(58) Field of Classification Search
USPC .................... 348/251; 382/274; 358/461, 521
See application file for complete search history.

(56) References Cited

U.S. PATENT DOCUMENTS

| 7,768,559 | B2 * | 8/2010 | Hunter et al. | 348/251 |
| 2008/0055430 | A1 | 3/2008 | Kirsch | |
| 2009/0190006 | A1 | 7/2009 | Huggett | |
| 2010/0165144 | A1 | 7/2010 | Lee | |
| 2011/0298944 | A1 * | 12/2011 | Kuo et al. | 348/223.1 |

* cited by examiner

Primary Examiner — James Hannett
Assistant Examiner — Angel L Garces-Rivera
(74) Attorney, Agent, or Firm — Michael H. Lyons

(57) ABSTRACT

A method of processing an image includes the steps of separating an image into multiple color channels, and dividing the image into multiple zones, in which each zone includes a sub-array of pixels. The method then calculates a color shading profile for each zone. The color shading profile is calculated as a linear function, typically a straight line. If a linear function cannot be determined for that zone, the method interprets a function for that zone using the nearest zone neighbors. The method corrects the color shading using the functions calculated for the respective zones.

18 Claims, 11 Drawing Sheets

| G1 | R | G1 | R | G1 | R |
|----|----|----|----|----|----|
| B | G2 | B | G2 | B | G2 |
| G1 | R | G1 | R | G1 | R |
| B | G2 | B | G2 | B | G2 |
| G1 | R | G1 | R | G1 | R |

BEFORE SMOOTHING

AFTER SMOOTHING

APPARATAUS AND METHOD OF AUTOMATIC COLOR SHADING REMOVAL IN CMOS IMAGE SENSORS

CROSS REFERENCE TO RELATED APPLICATIONS

This application claims priority of U.S. Provisional Patent Application Ser. No. 61/468,225, filed Mar. 28, 2011.

FIELD OF THE INVENTION

The present invention relates generally to lens shading correction for imaging devices.

BACKGROUND OF THE INVENTION

Solid state imaging devices, including charge coupled devices (CCD), complementary metal oxide semiconductor (CMOS) imaging devices and others, have been used in photo imaging applications. A solid state imaging device includes a focal plane array of pixel cells, or pixels as an image sensor. Each cell includes a photosensor, which may be a photogate, a photoconductor, a photodiode, or other photosensor having a doped region for accumulating photo-generated charge. For CMOS imaging devices, each pixel cell has a charge storage region, formed on or in the substrate, which is connected to the gate of an output transistor that is part of a readout circuit. The charge storage region may be constructed as a floating diffusion region. In some CMOS imaging devices, each pixel cell may further include at least one electronic device, such as a transistor for transferring charge from the photosensor to the storage region and one device, also typically a transistor, for resetting the storage region to a predetermined charge level.

One problem experienced in film and solid state cameras is lens shading. Lens shading can cause pixel cells in a pixel array located farther away from the center of the pixel array to have a lower pixel signal value when compared to pixel cells located closer to the center of the pixel array, even when all pixel cells are exposed to the same illuminant condition. Optical vignetting and pixel vignetting are two sources of lens shading. Optical vignetting is the fall-off in irradiance inherent in optical lens systems and is more pronounced with wide angle lenses and lenses using wide open apertures. Pixel vignetting, on the other hand, is the fall-off in irradiance inherent in photosensors and is affected by many factors such as, for example, microlens placement, photosensor layout and depth of the photon well.

Variations in a pixel value caused by lens shading can be measured and the pixel value can be adjusted to compensate for the lens shading. For example, lens shading can be adjusted using a set of positional gain adjustment values, which modify pixel values in post-image capture processing. Positional gain adjustments across the pixel array can be provided as digital gain values, one corresponding to each of the pixels. It may happen that the further away a pixel is from the center of the pixel array, the more gain is needed to be applied to the pixel value. The set of digital gain values for the entire pixel array forms a gain adjustment surface.

Lens shading correction for color image sensors may be defined for each of a plurality of color channels in order to correct for lens shading variations across color channels. For these color image sensors, the gain adjustment surface is applied to the pixels of the corresponding color channel during post-image capture processing to correct for variations in pixel value due to the spatial location of the pixels in the pixel array. Monochrome image sensors, on the other hand, apply a single gain adjustment surface to all pixels of a pixel array. Likewise, color image sensors may choose to use a single gain adjustment surface across all color channels.

Since lens shading correction applies a digital gain at every pixel location, the digital gain values need to be either pre-stored or digitally computed by mimicking the desired pixel gain surface. In practice, the digital gain values are computed from an expression that approximates the desired pixel gain surface since the number of parameters needed to generate an approximate surface is generally significantly lower than the numbers of parameters needed to store the digital gain values for every pixel location. Some image sensors have built-in lens shading operation on-chip, while other image sensors rely on a separate image processing imaging chip for this operation.

It has been found that the lens shading properties of an image sensor can vary significantly with the spectral content of an imaged scene. When a gain adjustment surface is calculated for a specific color channel/camera/lens/IR-output filter, etc. combination, it is generally applied to all captured images from an imaging device having that combination. This does not present a particular problem when the captured image is taken under the same illuminant condition used to calibrate the gain adjustment surface. Lens shading, however, can vary significantly from one illuminate type to another type.

In FIG. 1, a plot of red pixel values along the center row of an image sensor is shown prior to lens shading correction. The plot illustrates the significant variation in lens shading under three illuminant conditions that are well-known to persons skilled in the art of image processing: D65, cool white fluorescent (CWF), and type A flat-fields. Application of a gain adjustment surface calibrated for a particular illuminant type, e.g., D65 flat-field, to an image captured under a different illuminant type, e.g., type A flat-field, can result in undesirable color shading errors.

Accordingly, methods and systems providing lens shading correction for pixel values of images captured under varying illuminant conditions are desirable.

BRIEF DESCRIPTION OF THE DRAWINGS

FIG. 4 illustrates a Bayer color filter pattern with four different colors.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient details to enable those skilled in the art to make and use them, and it is to be understood that structural, logical or procedural changes may be made to the specific embodiments disclosed. Particularly, in the description below, processes are described by way of flowchart. In some instances, steps which follow other steps may be in reverse or in a different sequence, or simultaneously, except where a following procedural step requires the presence of a prior procedural step. The processes described herein may be implemented in a pixel processing pipeline which in turn can be implemented using discrete hardware circuits, e.g., an application-specific integrated circuit (ASIC), a programmed processor, or a combination of the two, but are not limited to such an implementation.

As will be explained, the present invention provides automatic correction of color shading in image sensors without need for calibration and, more specifically, without need for a flat field or any other type of illuminant which is used for calibration. The present invention divides an image into multiple sections, referred to herein as zones. The present invention assumes that the shading profile within each zone could be approximated as linear when the zones are properly set. A correction gain map is generated for the zones of an image by calculating linear shading profiles for the zones of the image. The pixels within each zone have their gains corrected, based on the generated correction gain map.

In order to fully appreciate the advantages of the present invention over conventional lens shading removal methods, reference is now made to U.S. Patent Application No. 2010/0165144, published on Jul. 1, 2010. This application is incorporated herein by reference in its entirety.

Figure 1:
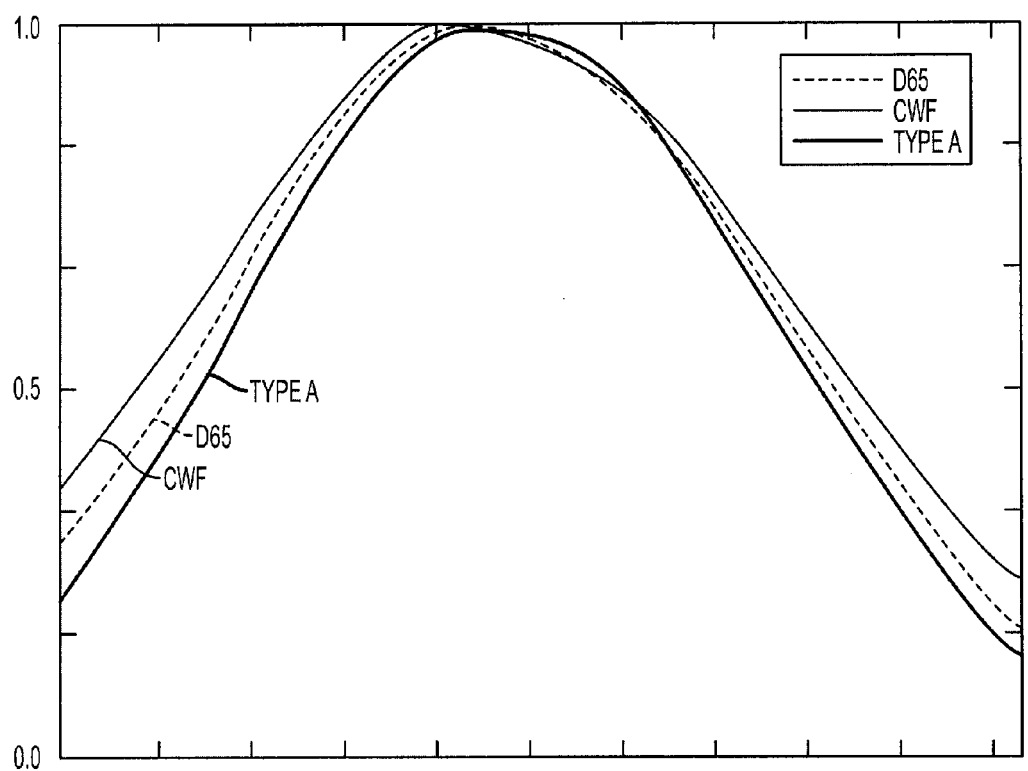
FIG. 1 illustrates the illuminant dependence of lens shading.
Figure 2:
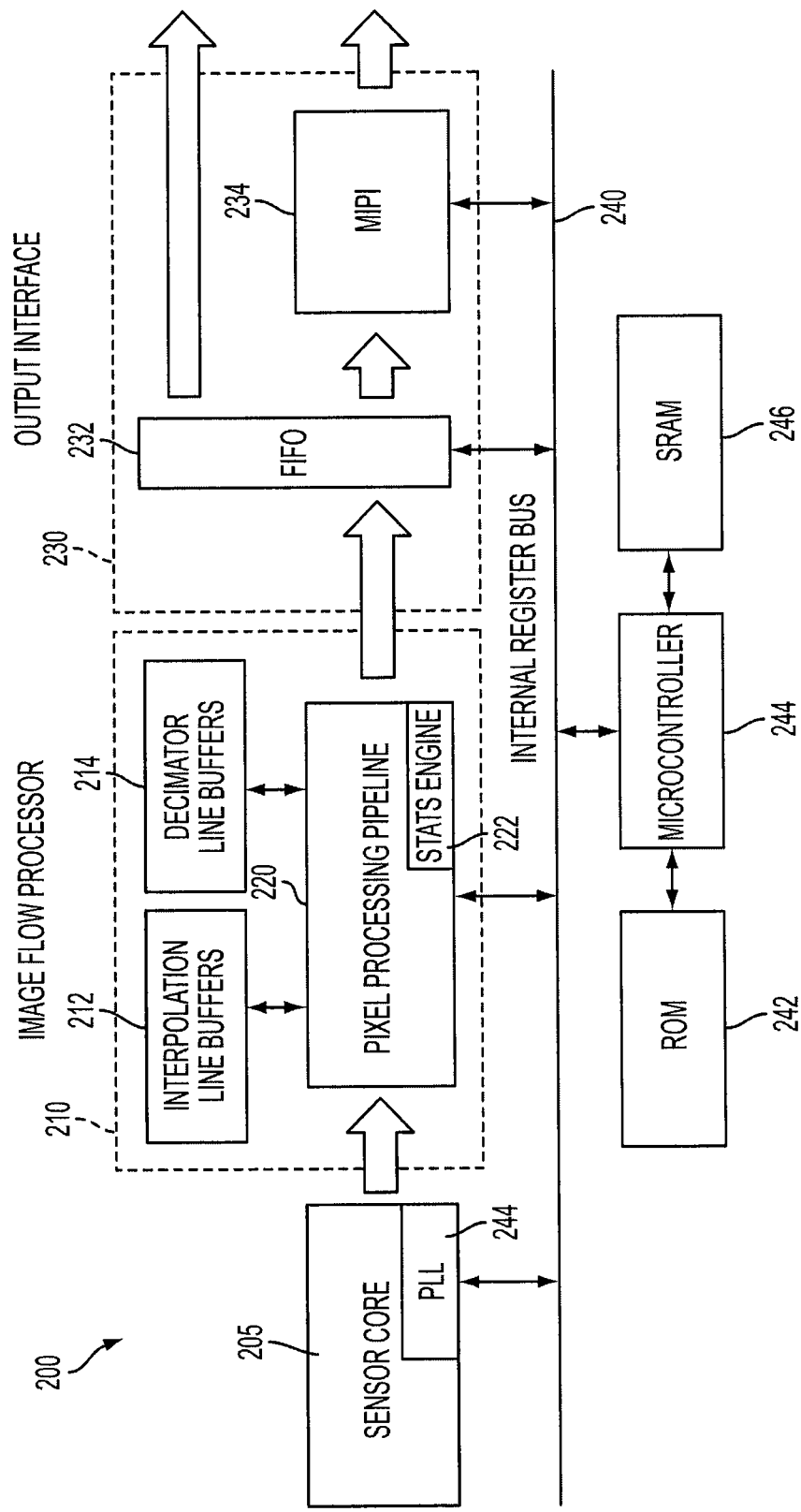
FIG. 2 illustrates a block diagram of system-on-a-chip imaging device.

Turning first to FIG. 2, an embodiment of the present invention is now described in greater detail. As shown, FIG. 2 is a block diagram of an exemplary system-on-a-chip (SOC) imaging device 200. The imaging device 200 includes a sensor core 205 that communicates with an image flow processor 210 that is also connected to an output interface 230. A phase locked loop (PLL) 244 is used as a clock for the sensor core 205. The image flow processor 210, which is responsible for image and color processing, includes interpolation line buffers 212, decimator line buffers 214, and pixel processing pipeline 220. One of the functions of the pixel processing pipeline 220 is to perform pixel processing operations, such as color shading correction in accordance with the disclosed embodiments. The pixel processing pipeline 220 includes, among other things, a statistics engine 222. The output interface 230 includes a first-in-first-out (FIFO) parallel output 232 and a serial Mobile Industry Processing Interface (MIPI) output 234. The user can select either a serial output or a parallel output by setting registers within the chip. An internal register bus 240 connects read only memory (ROM) 242, a microcontroller 244 and a static random access memory (SRAM) 246 to the sensor core 205, image flow processor 210 and the output interface 230. The read only memory (ROM) 242 may serve as a storage location for zone statistics and gain correction maps.

Figure 3:
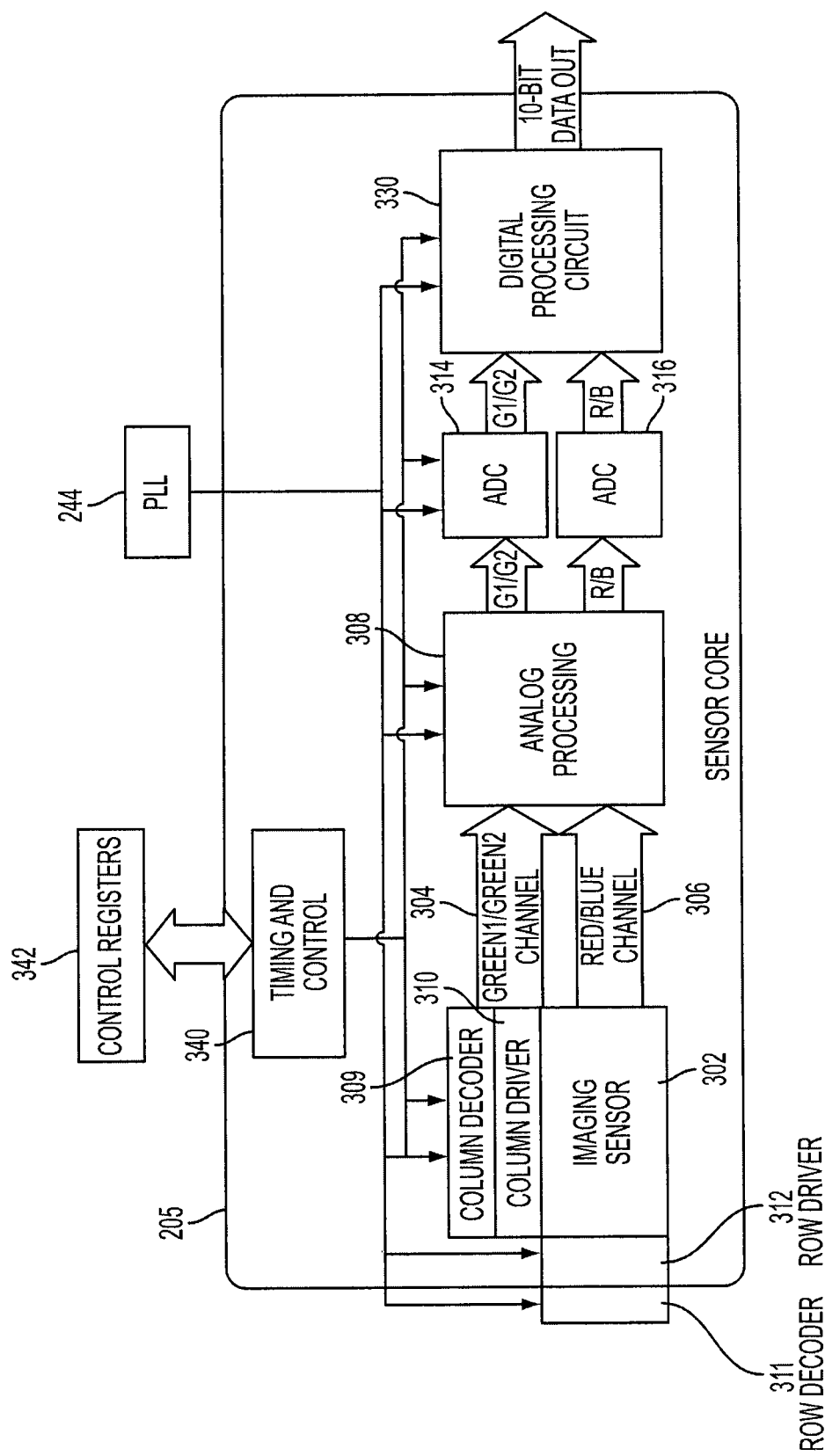
FIG. 3 illustrates an example of a sensor core used in the FIG. 2 device.

FIG. 3 illustrates a sensor core 205 used in imaging device 200 shown in FIG. 2. The sensor core 205 includes an imaging sensor 302, which is connected to analog processing circuitry 308 by a green-red (or green1, G1)/green-blue (or green2, G2) channel 304 and a red/blue channel 306. The red, blue, green-red, and green-blue colors come from a Bayer color filter pattern, which organizes a color filter array, such that 50% is green, 25% is red and 25% is blue. Specifically, the red and blue pixel cells are arranged in rows and columns with a green pixel cell between every two red and blue pixel cells. An example of a Bayer color filter pattern is shown as element 400 in FIG. 4.

Although only two channels 304, 306 are illustrated in FIG. 3, there are effectively two green channels, one red channel and one blue channel, for a total of four color channels. The green-red (i.e., G1) and green-blue (i.e., G2) signals are read out at different times (using channel 304), and the red and blue signals are read out at different times (using channel 306). The analog processing circuitry 308 outputs processed green-red/green-blue signals (G1/G2) to a first analog-to-digital converter (ADC) 314, and outputs processed red/blue signals (R/B) to a second analog-to-digital converter (ADC) 316. The outputs of the two analog-to-digital converters 314, 316 are sent to digital processor 330.

It will be appreciated that although sensor core 205 has been described with regard to four color channels, G1, G2, R and B, the embodiments are not so limited in number or color. Additionally, sensor core 205 represents one example of an architecture of a CMOS sensor core; however, disclosed embodiments can be used with any type of solid-state sensor core, including CCD and others.

Connected to, or as part of, imaging sensor 302 are row and column decoders 311, 309 and row and column driver circuitry 312, 310 that are controlled by a timing and control circuit 340. The timing and control circuit 340 uses control registers 342 to determine how imaging sensor 302 and other components are controlled, for example, controlling the mode of operation of imaging sensor 302. As set forth above, PLL 244 serves as a clock for the components in core 205.

The imaging sensor 302 includes a plurality of pixel circuits arranged in a predetermined number of columns and rows. In operation, the pixel circuits of each row in imaging sensor 302 are all operated on, at the same time, by a row select line; and the pixel circuits of each column are selectively output onto column output lines by a column select line. A plurality of row and column lines are provided for the entire imaging sensor 302. The row lines are selectively activated by row driver circuitry 312, in response to the row address decoder 311; and the column select lines are selectively activated by a column driver 310, in response to the column address decoder 309. Thus, a row and column address is provided for each pixel circuit. The timing and control circuit 340 controls address decoders 311, 309 for selecting the appropriate row and column lines for pixel readout, and the row and column driver circuitry 312, 310 for driving voltages to the drive transistors of the selected row and column lines.

For the CMOS architecture, however, each column contains sampling capacitors and switches in the analog processing circuit 308 that read a pixel reset signal Vrst and a pixel image signal Vsig for selected pixel circuits. Because core 205 uses green-red/green-blue channel 304 and a separate red/blue channel 306, circuitry 308 has the capacity to store Vrst and Vsig signals for green-red, green-blue, red, and blue pixel signals.

A differential signal (Vrst-Vsig) is produced by differential amplifiers contained in circuitry 308 for each pixel. Thus, each of the signals G1, G2, R and B are differential signals that are then digitized by a respective analog-to-digital converter 314, 316. The analog-to-digital converters 314, 316 supply digitized G1, G2, R and B pixel signals to digital processor 330, which forms a digital image output (e.g., a 10-bit digital output). The digital processor 330 provides digital pixel values to image flow processor 210 (FIG. 2).

Figure 5:
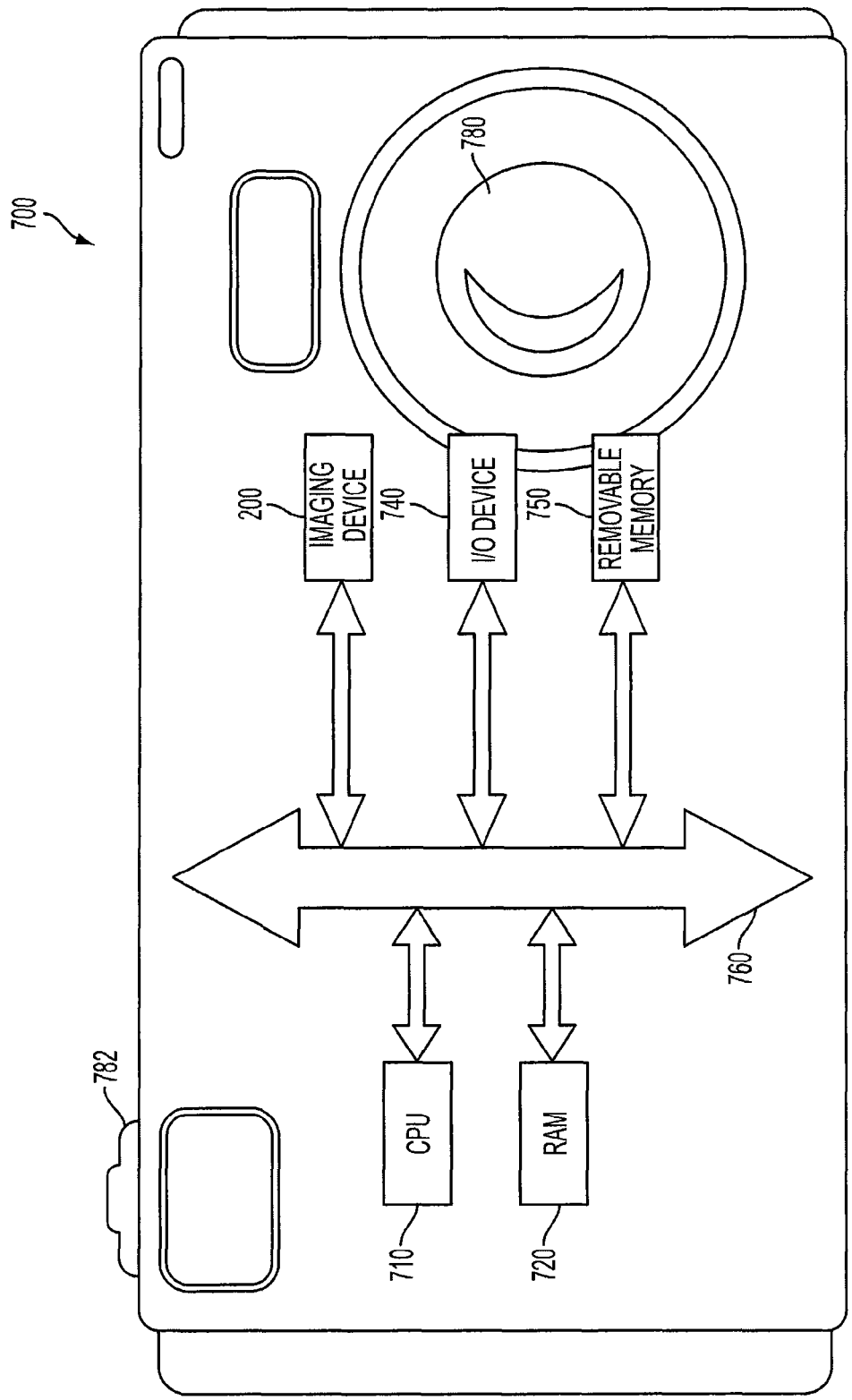
FIG. 5 shows a system embodiment incorporating at least one imaging device.

Although sensor core 205 has been described with reference to use with a CMOS imaging sensor, this is merely one example sensor core that may be used. Embodiments described herein may also be used with other sensor cores, including those supporting CCD, and other sensors having a different readout architecture. While imaging device 200 (FIG. 2) is shown as a system-on-a-chip, it will be appreciated that the embodiments are not so limited. Other imaging devices, such as, a stand-alone sensor core 205 coupled to a separate signal processing chip or co-processor may be used in accordance with the embodiments. While automatic color shading correction has been described as occurring in the pixel processing pipeline 220 (FIG. 2), it will be appreciated that color shading correction can be performed in digital processor 330 with a built-in white balance algorithm (FIG. 3). Additionally, raw imaging data can be outputted from the 10-bit data output (FIG. 3) and stored and corrected elsewhere, for example, in system 700 shown in FIG. 5, or in a stand-alone image processing system.

According to one example, system 700 includes lens 780 for focusing an image on imaging device 200 when a shutter release button 782 is pressed. System 700 generally includes a central processing unit (CPU) 710, such as a microprocessor that controls camera functions and image flow, and communicates with an input/output (I/O) device 740 over bus 760. The imaging device 200 also communicates with CPU 710 over bus 760. The system 700 also includes random access memory (RAM) 720 and removable memory 750, such as a flash memory, which communicates with CPU 710 over bus 760.

The imaging device 200 may be combined with CPU 710, with or without memory storage on a single integrated circuit, such as a system-on-a-chip, or on a chip different from CPU 710. As described above, raw RGB image data from imaging sensor 302 (FIG. 3) can be output from imaging device 200 and can be stored, for example, in random access memory 720, or CPU 710. Automatic color shading correction can then be performed on the raw RGB image data, or on the stored data in accordance with the disclosed embodiments. In other embodiments, color/lens shading correction can be performed on the raw RGB data, or the stored data by CPU 710, or can be sent outside the camera and operated on by a stand-alone processor, e.g., a computer, external to system 700.

Additionally, the disclosed embodiments can be implemented in hardware or software. That is, the methods described can be implemented in a pixel processing circuit, which can be part of pixel processing pipeline 220 (FIG. 2). The pixel processing circuit can be implemented, for example, as hardware logic, a programmed processor, a combination of the two, or with other signal processing circuits. The methods described can be implemented in computer instructions and stored in a computer readable medium to perform the steps outlined below.

The methods of the present invention are based on an assumption that color shading is a slow changing hue-transition across an image. The change appears strongest at the corner and the edges of the image. As will be explained, the present invention separately corrects each color channel in order to reduce color tinge due to shading and cross-talk.

To reduce complexity and correction errors, the color shading correction of the present invention is zone-based. In other words, the image is divided into multiple zones. For example, for a 5 megapixel (5M) raw image of size 1952×2600 pixels, the present invention divides the raw image into 20×26 zones. Each zone, thus, in this example, includes a sub-array of about 100×100 pixels.

To further reduce complexity, the present invention stores only one correction gain value for each zone per color channel. These correction gain values are referred to herein as statistics. The invention, however, is not limited to storing only one correction gain value per zone, and more than one correction gain value per zone may be stored as statistics. In the case of one correction gain value, the value is typically assigned to the center of a respective zone. Each zone thus has one correction gain value, which is placed at the center of its sub-array.

In addition, a color correction gain value in another zone can be interpreted (or extrapolated) from color correction gain values which have been stored in the surrounding zones. The individual pixel color correction gain can then be interpreted from four surrounding zone correction gains. Since a correction gain value is applied to each pixel within a zone, without filtering of the pixel values, the present invention advantageously does not blur edges or remove any detail or texture from the image.

Figure 6:
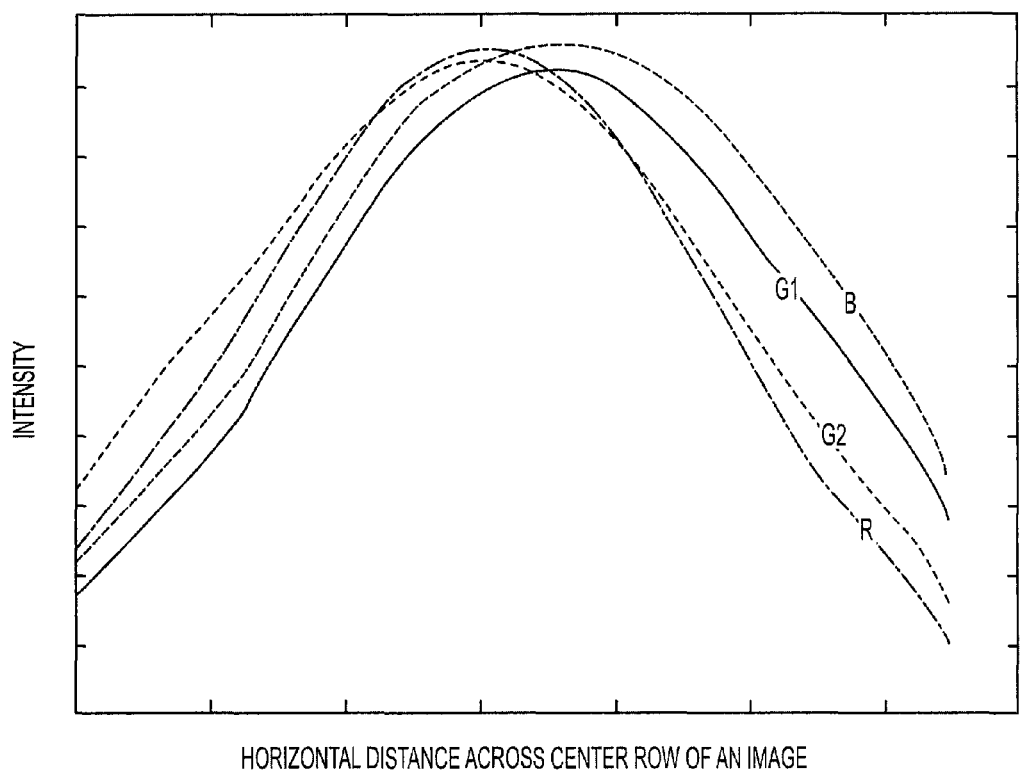
FIG. 6 shows plots of shading profiles from four color channels in a flat field image across the center horizontal row of a 5 megapixel (M) raw image.

Advantageously, the present invention does not rely on calibration data from flat field capture. The present invention is calibration-less. In other words, a raw image is processed to remove the color shading or tinge, without need of extra data. The inventor realized that the shading profiles of various flat field images approximate profiles that have similar shapes. For example, FIG. 6 shows the color shading profiles of a flat field image across the center row of a 5 megapixel raw Bayer image. Four profiles are shown, one for each color channel, namely G1, G2, R and B. It will be appreciated that the four color channels approximate profiles that are similar to each other. They all look like an upside-down bowl.

Accordingly, in the calibration-less color shading removal methods of the present invention, the four profiles for the G1, G2, R and B channels, are each modified so that all four profiles merge into one profile. This profile-merging process is referred to herein as an automatic color shading removal. This one resulting profile is then used as the correction profile for all four channels to correct the intensity/luminance fall-off. In another embodiment of the present invention, the method modifies one of the profiles of G1, G2, R, or B; and then uses the one modified profile as the correction profile for all four channels.

After automatic color shading correction, since the lens shading profiles are the same for all four color channels, one polynomial expression is used to correct intensity/luminance fall-off from the lens vignetting, fitting the two G channels and next fitting the R and B channels, in no particular order.

The inventor also realized that although shading is worse away from the center of an image and worst at the corners of the image, nevertheless, the overall change in shading is slow. More specifically, in each zone-based partitioning of an image, the color shading profile is assumed to be linear. This assumption of a localized linear zone simplifies the complexities associated with color shading estimation of conventional systems.

As an example of correcting the color shading of an image, the following provides a pseudo color code as a method for color shading removal:

First, define zone size and zone number for an image, total zones N×M.

Next, apply auto white balance (AWB) gain information globally, so that AWB gains will not affect shading profile analysis.

Then, "for each zone" perform the following:

(1) First remove G1 and G2 imbalance by using average weight or mean values in each zone to balance G1/G2 and obtain a balanced G;

(2) Scan lines in each zone to find "linear" horizontal profiles of G (balanced G1 and G2), R and B;

(3) Determine G', R' and B' as pure shading profiles, so that color patches will not be recognized as gray;

(4) Determine the R gain as G'/R'; and determine the B gain as G'/B';

(5) If linear profiles (also referred to herein as a linear function) cannot be found in a zone, then leave the zone statistics as blank and interpret (or extrapolate) a profile from neighboring zones later;

End of "for each zone".

For each zone, store a statistic that includes an average profile of all the linear profiles found within the respective zone.

Using the stored statistics for the zones, perform a gain map analysis. Extrapolate a statistic for missing gain values of some zones for which linear functions could not be found; also perform smoothing or filtering of the R and B gain maps over all zones.

Interpret R, G and B correction gain values for each pixel from the zone gain maps and apply to each individual pixel in order to reduce the color shading.

In the above method, the green imbalance is first corrected for each zone. An example of a correction method for green imbalance includes using the average of G1 and G2 as the target G' for the zone. In this manner, G1 and G2 gains for the zone are determined by dividing the target G' by the average value of G1 and the average value of G2, respectively.

The gain values for the individual G pixel (either G1 or G2) can then be separately interpreted from four surrounding zone neighbors (using respective zone-center gain values).

After the green imbalance is removed, the present invention determines color shading removal in the red and blue channels. In essence, the method finds zones with a linear profile of red or blue, and estimates the shading ratio for the zone. Other undetermined regions can then be interpreted from the surrounding regions, in which the correction gains have been estimated already.

Figure 7A:
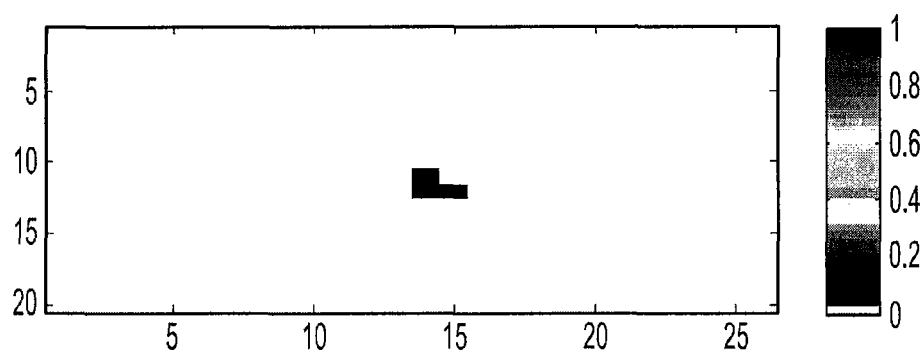
FIG. 7A shows an example of several zones in an image map for the red channel, in which linearity cannot be determined and, thus, need interpretation from nearest zone neighbors, in accordance with an embodiment of the present invention.
Figure 7B:
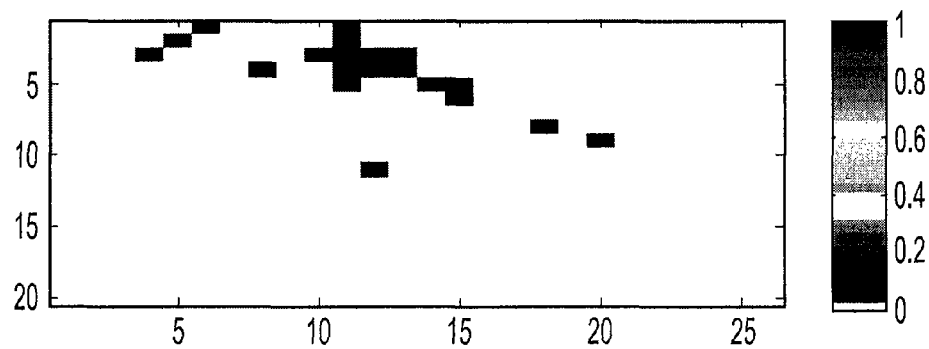
FIG. 7B shows an example of several zones in an image for the blue channel, in which linearity cannot be determined and, thus, need to be interpreted from nearest zone neighbors, in accordance with an embodiment of the present invention.

FIGS. 7A and 7B are examples of image maps that include zones for which linearity cannot be determined and thus need to be interpreted. FIG. 7A is for the red channel, and FIG. 7B is for the blue channel. The shaded blocks indicate the zones that need to be interpreted for the red and blue channels, respectively.

The interpretation (or extrapolation), as one example, is a bilinear interpretation from the nearest four neighbor zones with gain values already determined in the horizontal and vertical directions. In addition, if a corner zone cannot be interpreted in either the horizontal or vertical direction, then the method, for example, fills in the gain values from the nearest adjacent neighbor zones having valid gains.

Figure 8A:
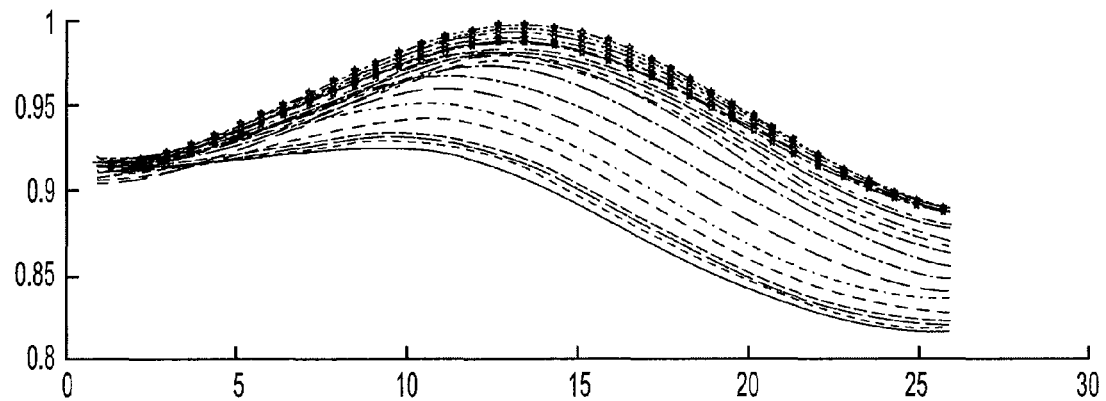
FIG. 8A shows an example of correction gain profiles of different horizontal rows in an image for the red channel, in accordance with an embodiment of the present invention.
Figure 8B:
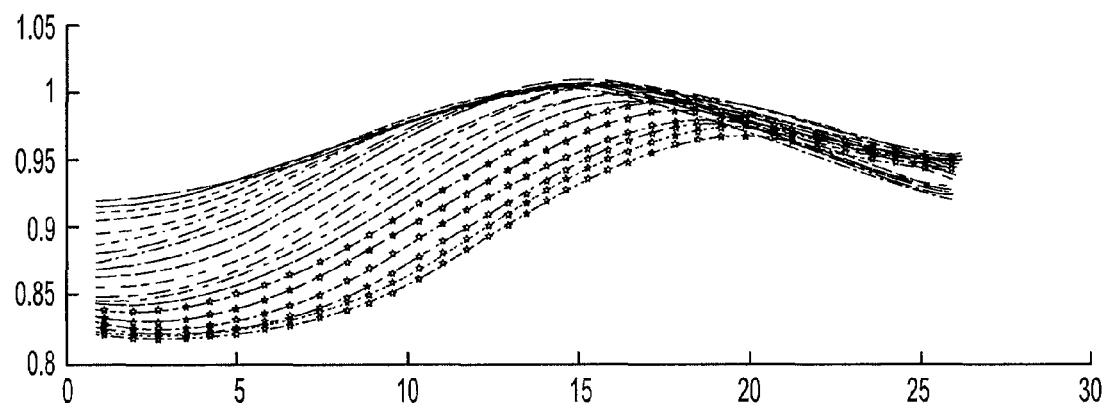
FIG. 8B shows an example of correction gain profiles of different horizontal rows in an image for the blue channel, in accordance with an embodiment of the present invention.

FIGS. 8A and 8B are examples of correction gain profiles for different horizontal lines (pixel rows) of a captured raw image. FIG. 8A is for the red channel, and FIG. 8B is for the blue channel. It is useful to examine the shading correction gains in the horizontal direction from the shape of each line, and also examine the shading correction gain changes in the vertical direction. This can be done by examining the differences between adjacent lines. The figures also include missing zone values that have been interpreted, and gain profiles that have been smoothed.

Figure 9A:
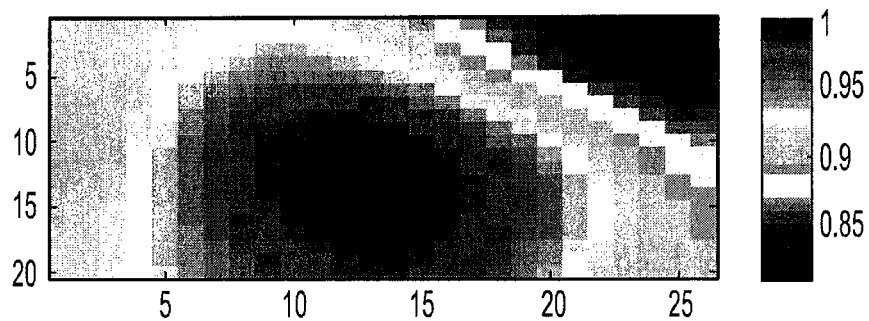
FIG. 9A is an example of a correction gain map showing different zones in an image for the red channel, in accordance with an embodiment of the present invention.
Figure 9B:
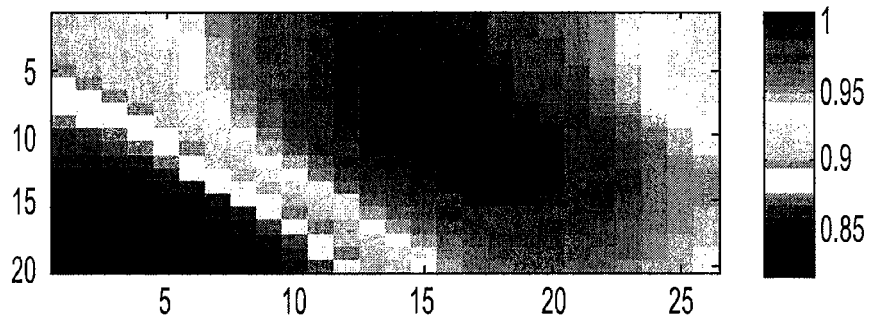
FIG. 9B is an example of a correction gain map showing different zones in an image for the blue channel, in accordance with an embodiment of the present invention.

FIGS. 9A and 9B are examples of correction maps of an image. FIG. 9A is for the red channel; FIG. 9B is for the blue channel. It is useful to examine the final correction gain maps across the blue and red channels for the entire image.

Figure 10:
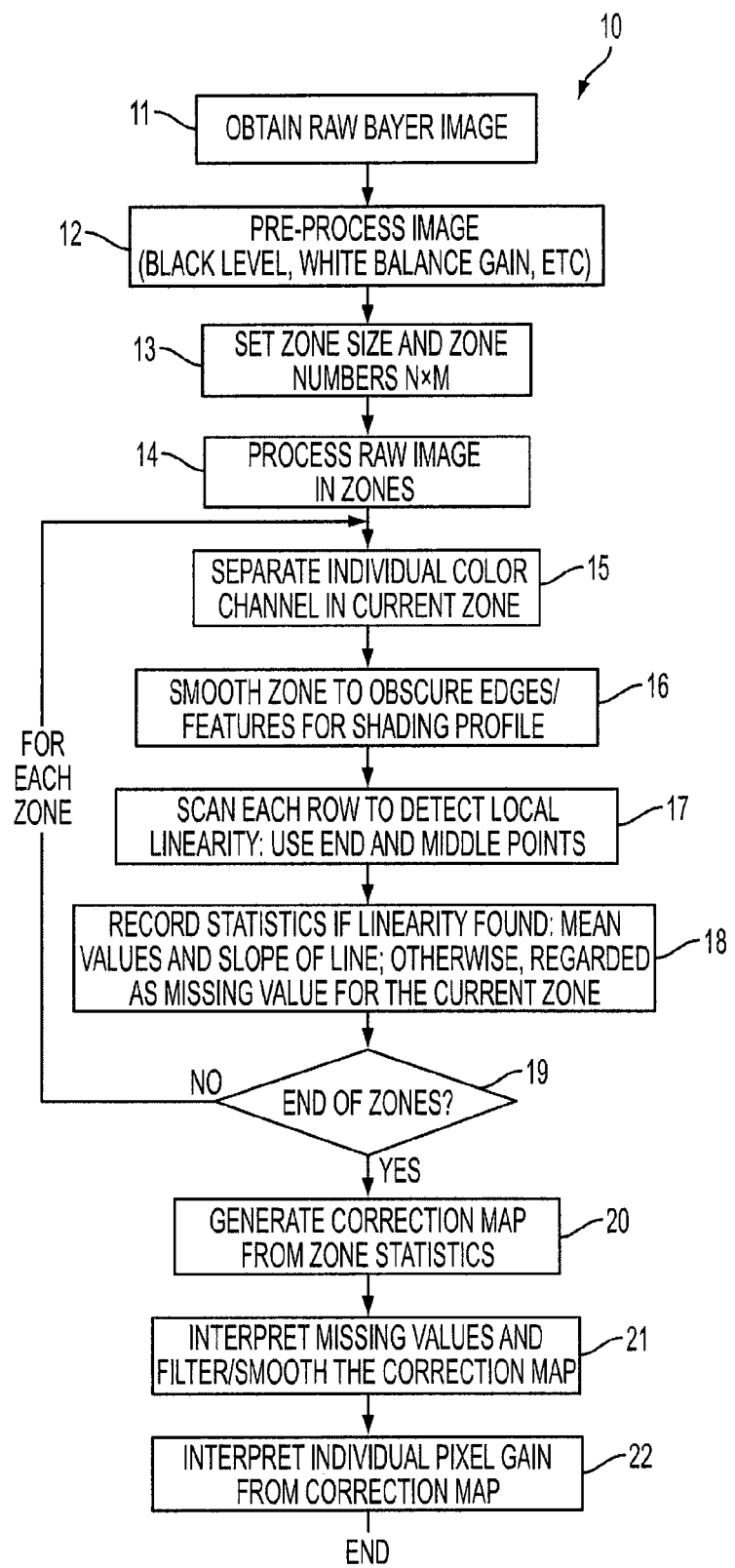
FIG. 10 shows a method for automatic color shading correction of pixel values for a captured image from solid state imaging sensors, in accordance with an embodiment of the present invention.

Referring next to FIG. 10, there is shown an example of a method for removing color shading in an image, the method generally designated as 10. The method, in step 11, receives a raw Bayer image. An example of a Bayer raw color filter pattern is shown in FIG. 4. As shown, the Bayer pattern includes four different color channels, namely, G1, G2, R and B. Using step 12, the method pre-processes the image so that an auto white balance (AWB) is calculated and the gain information of AWB is stored.

Step 13 defines the number of zones and the zone size of the image; each zone can be numbered, so that statistics of each zone can be properly stored into a memory. The total number of zones is N×M. Each zone, for example, may have a size of 200 by 220 pixels. Furthermore, as an example, the image may be divided into 10×12 zones.

The method enters step 14 and processes the raw image within each designated zone. For each designated zone, the method executes steps 15 through 19 until all the zones have been processed.

Each zone is first separated into individual color channels by step 15. For example, each zone may include four color channels, such as G1, G2, R and B. Step 16 then smoothes or filters the current zone so that edges or prominent features within the current zone is obscured.

Figure 11A:
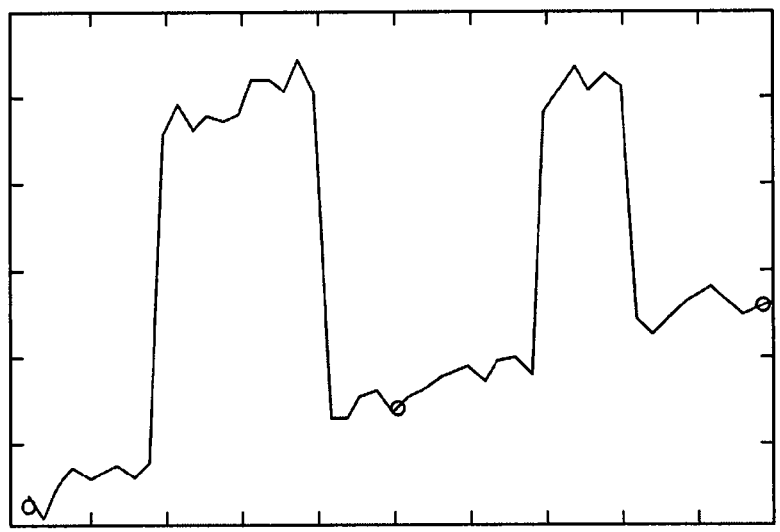
FIG. 11A is an example of intensity values of a specific line, or row within a zone of a particular color channel of an image, before smoothing or filtering of those intensity values.
Figure 11B:
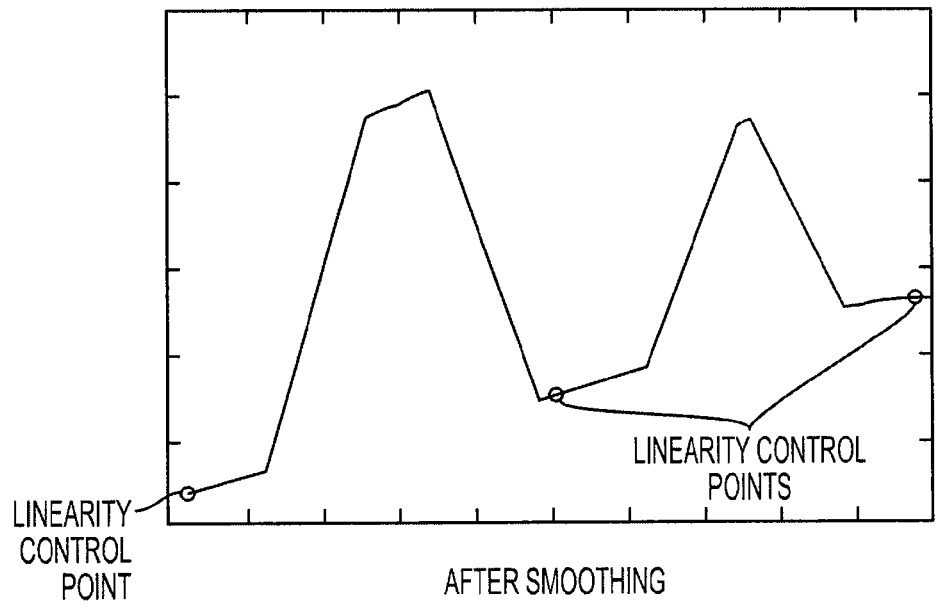
FIG. 11B is a smoothed or filtered curve of the intensity values of the line, or row shown in FIG. 11A, in accordance with an embodiment of the present invention.

Step 17 then scans each row within the current zone in order to determine a local linearity for the current zone. This is done by finding a "straight line" through end and middle points of each row using the principle of three points determine a line, as shown in FIGS. 11A and 11B. For example, FIG. 11A shows a row within a current zone having two prominent features, indicated by two intensity bursts. After smoothing or filtering the row, the intensity peaks are smoother an less prominent, as shown in FIG. 11B.

If linearity is found in step 17, then the method records the statistics for that linearity (a linear function) by storing the mean value and slope of a line for the current zone. This is performed by step 18. It will be appreciated that one linear function may be stored for the current zone by averaging the slopes of all the rows within the current zone. It should be appreciated that the method may only use one line buffer to process each row to determine linearity. This would be hardware-efficient. One mean value and slope of a line (one linear function) is recorded in the storage memory.

Method 10 continues examining all the individual color channels of each zone for the entire captured image, by branching from decision box 19 either back to step 15, or exiting to step 20. When decision box 19 determines that all zones have been smoothed, scanned and recorded, the method branches to step 20.

The method uses step 20 to generate a correction map, based on the zone statistics stored for the zones within each color channel. For zones in which linearity cannot be found, step 21 interprets missing values for those zones and filters the correction map. Finally, step 22 interprets individual pixels gains from the correction map for each color channel.

It will be appreciated that by using three control points, as shown in FIGS. 11A and 11B to determine the linear function, image details or features have less impact on determining the final shading profile. The manner in which the linear function is determined is described below:

Assume the coordinate system as (x, y), let two end points be $(e_1(x), e_1(y))$ and $(e_2(x), e_2(y))$, respectively. Let the middle point be $(m(x), m(y))$. Using the principle of three points to determine a line, the linearity of a line can be determined using the following equation:

$$\frac{(e_2(y) - m(y))}{(e_2(x) - m(x))} = \frac{(m(y) - e_1(y))}{(m(x) - e_1(x))}$$

It will be appreciated, however, that a straight line from an approximated shading profile is likely not achievable. Therefore, a tolerance (positive small value), $\delta$, is introduced, as follows:

$$\frac{(e_2(y) - m(y))}{(e_2(x) - m(x))} - \frac{(m(y) - e_1(y))}{(m(x) - e_1(x))} < \delta$$

Then, if the above equation is true, the underlying shading profile is determined as linear. A linear function has been found in the current zone.

While the embodiments have been described in detail in connection with embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with image data from other types of imaging sensors, for example, CCD imagers and others.

What is claimed:

1. A method of processing an image comprising the steps of:
    obtaining a first color shading profile for the image;
    obtaining a second color shading profile for the image;
    modifying the first and second color shading profiles to form a third color shading profile; and
    correcting color shading of the image based on the third color shading profile, wherein obtaining the first color shading profile includes:
        dividing the image into a plurality of zones, each respective zone including a sub-array of pixels;
        separating each respective zone into multiple color channels; and
        scanning each row within a color channel of each respective zone to determine a linear function representing the scanned row.

2. The method of claim 1 wherein obtaining the first color shading profile includes:
    estimating the first color shading profile of the respective zone, using multiple linear functions representing the scanned rows within the respective zone.

3. The method of claim 2 wherein determining the linear function includes:
    smoothing pixel values of a respective scanned row within a color channel of a respective zone; and
    forming a line representing intensity values using a middle and two end points of the respective scanned row.

4. The method of claim 3 including the steps of:
    averaging the formed lines of the scanned rows in a respective zone, by determining mean value and slope of a single line for the respective zone; and
    storing the mean value and slope of the single line as statistics of the respective zone.

5. The method of claim 4 including the steps of:
    if a linear function cannot be determined for a respective zone, interpreting a function for the respective zone using statistics from nearest zone neighbors; and
    storing the interpreted function as a statistic of the respective zone.

6. The method of claim 1 wherein
    obtaining the first color shading profile includes determining statistics for a green-red color channel;
    obtaining the second color shading profile includes determining statistics for a green-blue color channel; and
    forming the third color shading profile includes averaging the statistics from the green-red and green-blue color channels.

7. The method of claim 1 wherein
    obtaining the first color shading profile includes averaging statistics from a green-red color channel and a green-blue color channel to obtain averaged statistics for a green channel;
    obtaining the second color shading profile includes averaging statistics from a red color channel; and
    forming the third color shading profile includes dividing the statistics from the green channel with the statistics from the red color channel.

8. The method of claim 1 wherein
    obtaining the first color shading profile includes averaging statistics from a green-red color channel and a green-blue color channel to obtain averaged statistics for a green channel;
    obtaining the second color shading profile includes averaging statistics from a blue color channel; and
    forming the third color shading profile includes dividing the statistics from the green channel with the statistics from the blue color channel.

9. The method of claim 8 wherein averaging statistics includes the steps of:
    dividing the image into multiple color channels, each color channel including multiple zones, each zone including a sub-array of pixels;
    scanning rows of each respective zone to determine a linear function representing intensity values of the respective row for the respective zone;
    averaging linear functions within a respective zone to provide a single linear function for the respective zone; and
    storing the averaged linear function as a statistic for the respective zone.

10. The method of claim 9 including the steps of:
    if a linear function cannot be determined for a respective zone, interpreting a function for the respective zone using statistics from nearest zone neighbors; and
    storing the interpreted function as a statistic of the respective zone.

11. A method of processing an image comprising the steps of:
- separating an image into multiple color channels;
- dividing the image into multiple zones, each zone including a sub-array of pixels;
- calculating a color shading profile for each zone per color channel;
- correcting the color shading profile of each zone, using the color shading profiles calculated for the respective zones; and
- calculating a single linear function including mean value and slope of a line for each of the respective zones.

12. The method of claim 11 including the steps of:
- determining linear functions for rows, respectively, within a respective zone to obtain the single linear function for the respective zone; and
- determining a single linear function for a respective zone using determined single linear functions from nearest zone neighbors.

13. An imaging device comprising:
- an image processor configured to separate an image into multiple color channels;
- the image processor configured to divide the image into multiple zones, each zone including a sub-array of pixels;
- the image processor configured to calculate a color shading profile for each zone per color channel; and
- the image processor configured to correct the color shading profile of each zone, using the color shading profiles calculated for the respective zones, wherein the image processor is configured to determine a single linear function for a respective zone using determined single linear functions from nearest zone neighbors.

14. The imaging device of claim 13 wherein the image processor is configured to calculate a single linear function including mean value and slope of a line for each of the respective zones.

15. The imaging device of claim 14 wherein the image processor is configured to determine linear functions for rows, respectively, within a respective zone to obtain the single linear function for the respective zone.

16. The imaging device of claim 13 wherein the image processor is configured to estimate a shading profile for a green color channel of the image by averaging color shading profiles of respective zones in green-red and green-blue color channels.

17. The imaging device of claim 13 wherein the image processor is configured to estimate a shading profile for a red color channel of the image by dividing color shading profiles of respective zones in a green color channel with color shading profiles of respective zones in a red color channel.

18. The imaging device of claim 13 wherein the image processor is configured to estimate a shading profile for a blue color channel of the image by dividing color shading profiles of respective zones in a green color channel with color shading profiles of respective zones in a blue color channel.

* * * * *